(12) United States Patent
Hung et al.

(10) Patent No.: US 8,837,063 B2
(45) Date of Patent: Sep. 16, 2014

(54) COLOR FILTER AND MANUFACTURING METHOD THEREOF

(75) Inventors: Shao-Min Hung, Tainan County (TW);
Han-Kang Liu, Tainan County (TW);
Bo-Nan Chen, Tainan County (TW)

(73) Assignee: Himax Semiconductor, Inc., Tainan (TW)

( * ) Notice: Subject to any disclaimer, the term of this patent is extended or adjusted under 35 U.S.C. 154(b) by 838 days.

(21) Appl. No.: 12/892,076

(22) Filed: Sep. 28, 2010

(65) Prior Publication Data

US 2012/0075736 A1  Mar. 29, 2012

(51) Int. Cl.
*G02B 5/20* (2006.01)
*G02F 1/1335* (2006.01)

(52) U.S. Cl.
CPC .......... *G02B 5/201* (2013.01); *G02F 1/133516* (2013.01); *Y10S 359/90* (2013.01)
USPC ............................. 359/891; 359/900; 427/162

(58) Field of Classification Search
CPC ....................................................... G02B 5/201
USPC ........ 430/321; 427/162, 163.1; 359/900, 627, 359/634, 636, 887, 891, 890; 349/106
See application file for complete search history.

(56) References Cited

U.S. PATENT DOCUMENTS

| | | | | |
|---|---|---|---|---|
| 1,989,748 A * | 2/1935 | Frieser | ........................ | 396/307 |
| 3,165,406 A * | 1/1965 | Murray | ........................ | 430/212 |
| 3,326,204 A * | 6/1967 | Frenkel et al. | ................. | 600/27 |
| 3,558,805 A * | 1/1971 | Watanabe | .................... | 348/291 |
| 5,889,628 A * | 3/1999 | Caine | ........................ | 359/891 |
| 6,476,888 B2 * | 11/2002 | Yamanashi | ................... | 349/106 |
| 6,876,505 B2 * | 4/2005 | Niwa | ............................ | 359/891 |
| 6,909,482 B2 * | 6/2005 | Olczak | ........................ | 349/113 |
| 6,999,147 B2 * | 2/2006 | Maeda | ........................ | 349/115 |
| 6,999,253 B1 * | 2/2006 | Niwa et al. | .................... | 359/892 |
| 7,314,282 B2 * | 1/2008 | Bhowmik | ...................... | 353/84 |
| 7,980,705 B2 * | 7/2011 | Ogawa | ........................ | 353/84 |
| 8,441,601 B2 * | 5/2013 | Lee et al. | .................... | 349/109 |
| 2007/0008462 A1 | 1/2007 | Yang et al. | | |

FOREIGN PATENT DOCUMENTS

| TW | 20061552 | 5/2006 |
|---|---|---|
| TW | 200724986 | 7/2007 |
| TW | 200914898 | 4/2009 |

* cited by examiner

*Primary Examiner* — Ricky D Shafer
(74) *Attorney, Agent, or Firm* — J.C. Patents

(57) ABSTRACT

A method for manufacturing a color filter is provided. The method includes following steps. A substrate is provided. A first filter layer is formed on a first part of a first region and a first part of a second region of the substrate. A second filter layer is formed on a second part of the second region. A third filter layer is formed on a second part of the first region and a third part of the second region. When a white beam is projected on the color filter, the first region and the second region reflect a plurality of color beams. A color filter manufactured through the method is also provided.

9 Claims, 3 Drawing Sheets

COLOR FILTER AND MANUFACTURING METHOD THEREOF

BACKGROUND OF THE INVENTION

1. Field of the Invention

The invention generally relates to an optical film and a manufacturing method thereof; and more particularly, to a color filter (CF) and a manufacturing method thereof.

2. Description of Related Art

Existing liquid crystal on silicon (LCoS) panels can be generally categorized into color filter LCoS (CF-LCoS) panels and color sequential LCoS (CS-LCoS) panels. In a CF-LCoS panel, a color filter (CF) is formed on the liquid crystal panel, and different colors are rendered through the color filter. Namely, spatial mixing is adopted to display color images, and the light source module correspondingly provides a white beam as the light source. In a CS-LCoS panel, no color filter is formed on the liquid crystal panel, and temporal mixing is realized through the color sequential (CS) technique, so as to display color images.

However, in order to form the color filter on the liquid crystal panel in a CF-LCoS panel, in a conventional color filter process, different colors of photoresists are formed through corresponding processes on the liquid crystal panel according to the desired pixel colors. Taking the RGBCY process as an example, because pixels of five different colors are to be formed on the liquid crystal panel, at least five corresponding processes have to be performed. Accordingly, in consideration of time and cost, a more economical color filter process is desired.

SUMMARY OF THE INVENTION

Accordingly, the invention is directed to a manufacturing method of a color filter (CF), wherein the manufacturing cost of the color filter is greatly reduced and the process time thereof is greatly shortened.

The invention is also directed to a color filter manufactured through an economical manufacturing method, wherein the color filter offers a good optical quality.

The invention provides a method for manufacturing a color filter. The method includes following steps. A substrate is provided, wherein the substrate has a first region and a second region. A first filter layer is formed on a first part of the first region and a first part of the second region. A second filter layer is formed on a second part of the second region. A third filter layer is formed on a second part of the first region and a third part of the second region. When a white beam is projected on the color filter, the first region and the second region reflect a plurality of color beams.

According to an embodiment of the invention, the first region is composed of a plurality of single-film filter units, and the second region is composed of a plurality of multi-film filter units.

According to an embodiment of the invention, the step of forming the first filter layer includes forming a plurality of first single-film filter units on the first part of the first region. When the white beam is projected on the first single-film filter units, the first single-film filter units reflect a first color beam.

According to an embodiment of the invention, the step of forming the third filter layer includes forming a plurality of second single-film filter units on the second part of the first region. When the white beam is projected on the second single-film filter units, the second single-film filter units reflect a second color beam.

According to an embodiment of the invention, the step of forming the second filter layer includes forming a plurality of first multi-film filter units on where the first part and the second part of the second region overlap each other. When the white beam is projected on the first multi-film filter units, the first multi-film filter units reflect a third color beam.

According to an embodiment of the invention, the step of forming the third filter layer includes forming a plurality of second multi-film filter units on where the second part and the third part of the second region overlap each other. When the white beam is projected on the second multi-film filter units, the second multi-film filter units reflect a fourth color beam.

According to an embodiment of the invention, the step of forming the third filter layer includes forming a plurality of third multi-film filter units on where the first part and the third part of the second region overlap each other. When the white beam is projected on the third multi-film filter units, the third multi-film filter units reflect a fifth color beam.

According to an embodiment of the invention, when the white beam is projected on the color filter, the first region reflects a yellow beam and a cyan beam.

According to an embodiment of the invention, when the white beam is projected on the color filter, the second region reflects a red beam, a blue beam, and a green beam.

According to an embodiment of the invention, the materials of the first filter layer, the second filter layer, and the third filter layer are color resists.

The invention provides a color filter including a substrate, a plurality of single-film filter units, and a plurality of multi-film filter units. The substrate has a first region and a second region. The single-film filter units are respectively disposed on the substrate and within the first region. The multi-film filter units are respectively disposed on the substrate and within the second region. When a white beam is projected on the color filter, the single-film filter units and the multi-film filter units reflect a plurality of color beams.

According to an embodiment of the invention, the single-film filter units include a plurality of first single-film filter units. When the white beam is projected on the first single-film filter units, the first single-film filter units reflect a first color beam.

According to an embodiment of the invention, the single-film filter units include a plurality of second single-film filter units. When the white beam is projected on the second single-film filter units, the second single-film filter units reflect a second color beam.

According to an embodiment of the invention, the multi-film filter units include a plurality of first multi-film filter units. When the white beam is projected on the first multi-film filter units, the first multi-film filter units reflect a third color beam.

According to an embodiment of the invention, the multi-film filter units include a plurality of second multi-film filter units. When the white beam is projected on the second multi-film filter units, the second multi-film filter units reflect a fourth color beam.

According to an embodiment of the invention, the multi-film filter units include a plurality of third multi-film filter units. When the white beam is projected on the third multi-film filter units, the third multi-film filter units reflect a fifth color beam.

According to an embodiment of the invention, when the white beam is projected on the color filter, the single-film filter units reflect a yellow beam and a cyan beam.

According to an embodiment of the invention, when the white beam is projected on the color filter, the multi-film filter units reflect a red beam, a blue beam, and a green beam.

According to an embodiment of the invention, the materials of the single-film filter units and the multi-film filter units are color resists.

As described above, a method for manufacturing a color filter is provided in an exemplary embodiment of the invention, wherein the process for forming a plurality of color pixels on a substrate is simplified based on the color mixing principles and by using half-tone masks.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
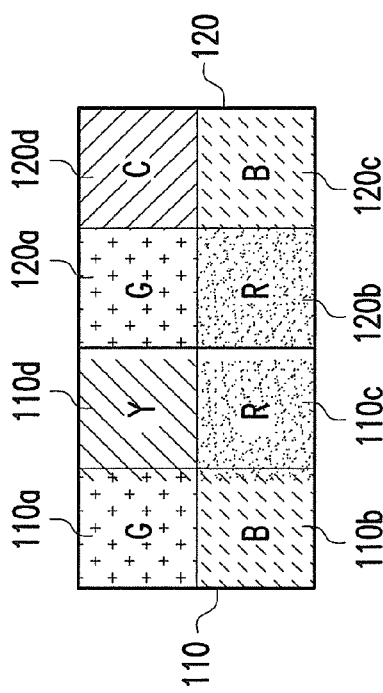
FIG. 1 is a top view illustrating two adjacent pixel units on a liquid crystal on silicon (LCoS) panel according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a top view illustrating two adjacent pixel units on a liquid crystal on silicon (LCoS) panel according to an embodiment of the invention.

Referring to FIG. 1, in the present embodiment, the LCoS panel is a color filter LCoS (CF-LCoS). A plurality of pixel units 110 and 120 that are connected with each other and periodically arranged is formed on the liquid crystal panel. However, in other embodiments, the pixel units may also be nonperiodically arranged.

In the present embodiment, each pixel unit has different colors of color filters (CFs), the LCoS panel displays different colors through the CFs and adopts spatial mixing to display color images, and the light source module correspondingly provides a white beam as the light source. Thus, when the white beam is projected on the LCoS panel, each pixel unit reflects different colors of light beams.

For the convenience of description, FIG. 1 only illustrates two adjacent pixel units 110 and 120 on the LCoS panel. In FIG. 1, each pixel unit includes a plurality of filter units, wherein each of the filter units may be a single-film filter unit or a multi-film filter unit, and which reflects a corresponding color beam.

Taking the pixel unit 110 as an example, the pixel unit 110 includes a plurality of filter units 110a-110d, wherein the filter unit 110d is a single-film filter unit, and the filter units 110a-110c are respectively a multi-film filter unit. Herein the symbol used for marking each filter unit indicates the color of the light beam reflected by the filter unit when the white beam is projected on the LCoS panel. For example, the filter unit 110a is marked with a symbol "G", which means when the white beam is projected on the LCoS panel, the filter unit 110a reflects a green beam. The symbols B, R, and Y respectively indicates that when the white beam is projected on the LCoS panel, the filter units 110b, 110c, and 110d respectively reflect a blue beam, a red beam, and a yellow beam.

On the other hand, the pixel unit 120 includes a plurality of filter units 120a-120d, wherein the filter unit 120d is a single-film filter unit, and the filter units 120a-120c are respectively a multi-film filter unit. Herein the filter units 120a, 120b, and 120c are the same as the filter units 110a, 110c, and 110b. When the white beam is projected on the LCoS panel, the filter units 120a, 120b, and 120c respectively reflect a green beam, a red beam, and a blue beam. Besides, the filter unit 120d is marked with a symbol "C", which means when the white beam is projected on the LCoS panel, the filter unit 110a reflects a cyan beam.

Figure 2:
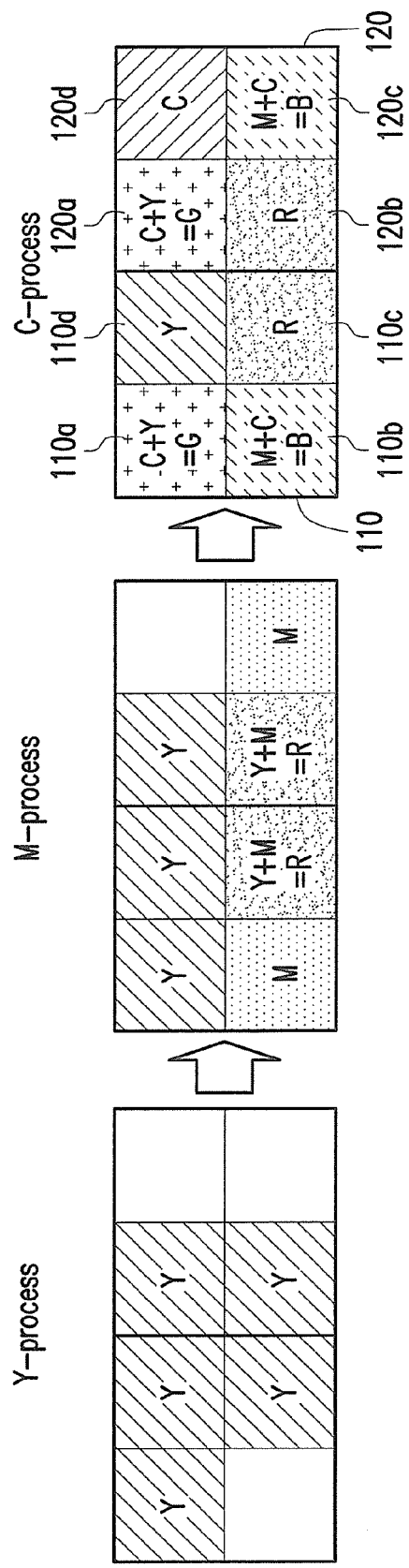
FIGS. 2-4 are respectively flowcharts illustrating a method for manufacturing a color filter according to an embodiment of the invention.
Figure 3:
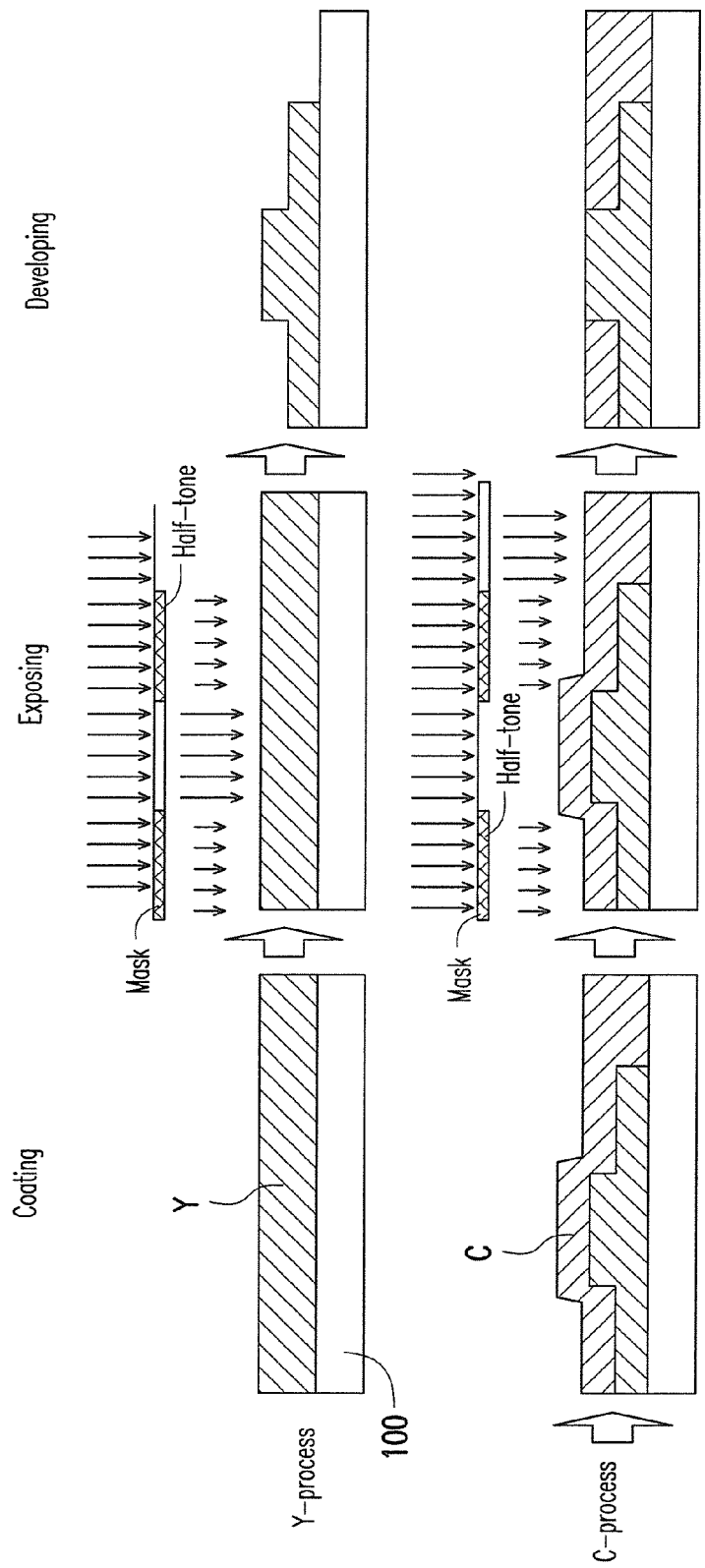
Figure 4:
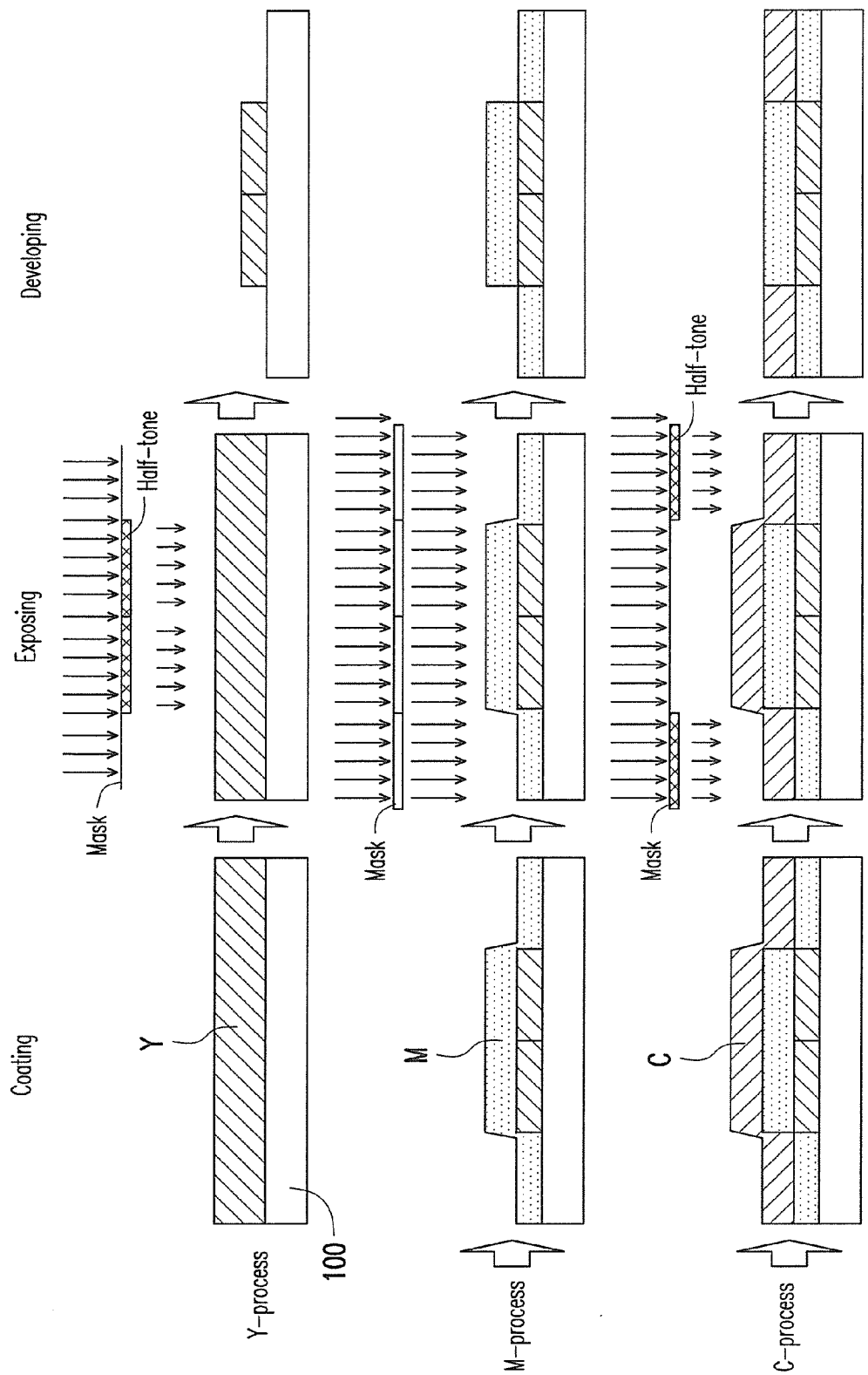

FIGS. 2-4 are respectively flowcharts illustrating a method for manufacturing a CF according to an embodiment of the invention. FIG. 2 is a top view illustrating the pixel units in FIG. 1, FIG. 3 is a cross-sectional view illustrating the pixel units in the top row in FIG. 1 (i.e., the filter units 110a, 110d, 120a, and 120d), and FIG. 4 is a cross-sectional view illustrating the pixel units in the bottom row in FIG. 1 (i.e., the filter units 110b, 110c, 120b, and 120c).

Referring to FIGS. 2-4, the CF manufacturing method provided by the present embodiment includes following steps. First, a substrate 100 is provided. In the present embodiment, the substrate 100 has a first region and a second region, wherein the first region is composed of a plurality of single-film filter units, and the second region is composed of a plurality of multi-film filter units. For example, after the manufacturing method in the present embodiment is completed, the single-film filter units 110d and 120d in FIG. 2 belong to the first region of the substrate 100, and the multi-film filter units 110a-110c and 120a-120c belong to the second region of the substrate 100.

Then, a first filter layer Y is formed on the filter unit 110d (i.e. a first part of the first region of the substrate 100) and the filter units 110a, 110c, 120a, and 120b (i.e., a first part of the second region of the substrate 100). Herein this step is referred to as a Y-process.

After the Y-process is completed, the first filter layer Y foams a single-film filter unit as the filter unit 110d, and when a white beam is projected on the single-film filter unit 110d, the single-film filter unit 110d reflects a yellow beam.

Additionally, after the Y-process is completed, the first filter layer Y also forms one layer of the multi-film filter units 110a, 110c, 120a, and 120b on the first part of the second region of the substrate 100.

In the present embodiment, the first filter layer Y may be made of a photosensitive material, such as a yellow negative photoresist, and the Y-process may be a coating, exposing, or developing step.

Particularly, in the present embodiment, the mask used in the exposing step may be a half-tone mask, such that the first filter layer Y of different thicknesses can be formed at different filter units in the developing step. Accordingly, taking the exposing step in the Y-process illustrated in FIG. 3 as an example, when an ultraviolet (UV) beam is projected on the masks having different transmissivities, the arrows having different lengths indicate the transmissivities of the corresponding masks.

For example, if after a UV beam passes through a mask, the length of the arrow is half of that before the UV beam passes through the mask, the mask is then considered a half-tone mask. Similarly, if the length of the arrow is not changed after the UV beam passes through a mask, the mask is then considered a full-tone mask, and if the UV beam cannot pass through a mask, the mask is then considered a non-transmissive mask.

After the Y-process is completed, as shown in FIG. 3, a first filter layer Y of different thicknesses is formed on the filter units 110a, 110d, 120a, and 120d, while as shown in FIG. 4, the first filter layer Y of the same thickness is formed on the filter units 110c and 120b.

Thereafter, a second filter layer M is foamed on the filter units 110b, 110c, 120b, and 120c (i.e., a second part of the second region of the substrate 100). This step is referred to as an M-process.

It should be noted that in the present embodiment, when the M-process is performed, the second filter layer M is not formed on the filter units 110a, 110d, 120a, and 120d in the top row. Thus, the M-process is not illustrated in the cross-sectional view of FIG. 3.

After the M-process is completed, the second filter layer M forms another layer of the multi-film filter units 110c and 120b on the second part of the second region of the substrate 100, and meanwhile, forms one layer of the multi-film filter units 110b and 120c. In the present embodiment, the second filter layer M may be made of a photosensitive material, such as a magenta negative photoresist.

Accordingly, as shown in FIG. 4, after the M-process is completed, the second filter layer M of the same thickness is formed on the filter units 110b, 110c, 120b, and 120c.

In other words, after the M-process is completed, the multi-film filter units 110c and 120b are formed on where the first part and the second part of the second region of the substrate 100 overlap each other, and the multi-film filter units 110c and 120b include the first filter layer Y and the second filter layer M. Based on the CMY color mixing principles, when a white beam is projected on the multi-film filter units 110c and 120b, the multi-film filter units 110c and 120b reflect a red beam. This is expressed as Y+M=R in FIG. 2.

Similarly, in the present embodiment, the M-process may be a coating, exposing, or developing step executed to form the second filter layer M. In particular, in the present embodiment, the mask used in the exposing step is a full-tone mask such that the second filter layer M of the same thickness can be formed at different filter units in the developing step.

Next, a third filter layer C is formed on the filter unit 120d (i.e., a second part of the first region of the substrate 100) and the filter units 110a, 110b, 120a, and 120c (i.e., a third part of the second region of the substrate 100). This step is referred to as a C-process.

After the C-process is completed, the third filter layer C forms a single-film filter unit at the filter unit 120d. When the white beam is projected on the single-film filter unit 120d, the single-film filter unit 120d reflects a cyan beam.

In addition, after the C-process is completed, the third filter layer C also forms another layer of the multi-film filter units 110a, 110b, 120a, and 120c on the third part of the second region of the substrate 100. In the present embodiment, the third filter layer C may be made of a photosensitive material, such as a cyan negative photoresist.

In other words, after the C-process is completed, the multi-film filter units 110b and 120c are formed on where the second part and the third part of the second region of the substrate 100 overlap each other. The multi-film filter units 110b and 120c include the second filter layer M and the third filter layer C. Based on the CMY color mixing principles, when the white beam is projected on the multi-film filter units 110b and 120c, the multi-film filter units 110b and 120c reflect a blue beam. This is expressed as M+C=B in FIG. 2.

On the other hand, after the C-process is completed, the multi-film filter units 110a and 120a are formed on where the first part and the third part of the second region of the substrate 100 overlap each other. The multi-film filter units 110a and 120a include the first filter layer Y and the third filter layer C. Based on the CMY color mixing principles, when the white beam is projected on the multi-film filter units 110a and 120a, the multi-film filter units 110a and 120a reflect a green beam. This is expressed as C+Y=G in FIG. 2.

Similarly, in the present embodiment, the C-process may be a coating, exposing, or developing step executed to form the third filter layer C. Particularly, in the present embodiment, the mask used in the exposing step is a half-tone mask, such that the third filter layer C of different thicknesses can be formed at the corresponding filter units in the developing step.

Accordingly, after foregoing processes Y, M, and C are completed, single-film filter units and multi-film filter units are formed on the substrate 100. Based on the CMY color mixing principles, the single-film filter units or the multi-film filter units render different colors of light beams through the color filter materials therein, so as to provide spatial color mixing and display color images. In other words, in the present embodiment, five colors of pixels are formed through only three processes.

It should be noted that in the present embodiment, the arrangement of the pixel colors is only an example but not intended to limit the scope of the invention. In other embodiments, the pixel colors may be arranged in different ways according to different design requirements.

In summary, a color filter manufacturing method is provided by exemplary embodiments of the invention, wherein the process for forming a plurality of color pixels on a substrate is simplified based on the color mixing principles and by using half-tone masks.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A manufacturing method of a color filter, comprising:
providing a substrate, wherein the substrate has a first region and a second region;
forming a first filter layer on a first part of the first region and a first part of the second region;
forming a second filter layer on a second part of the second region, wherein the step of forming the second filter layer comprises forming a plurality of first multi-film filter units on where the first part and the second part of the second region overlap each other, and when a white beam is projected on the first multi-film filter units, the first multi-film filter units reflect a third color beam; and
forming a third filter layer on a second part of the first region and a third part of the second region;
wherein when the white beam is projected on the color filter, the first region and the second region reflect a plurality of color beams.

2. The manufacturing method according to claim 1, wherein the first region comprises a plurality of single-film filter units, and the second region comprises the plurality of multi-film filter units.

3. The manufacturing method according to claim 1, wherein the step of forming the first filter layer comprises:
forming a plurality of first single-film filter units on the first part of the first region, wherein when the white beam is projected on the first single-film filter units, the first single-film filter units reflect a first color beam.

4. The manufacturing method according to claim 1, wherein the step of forming the third filter layer comprises:
forming a plurality of second single-film filter units on the second part of the first region, wherein when the white beam is projected on the second single-film filter units, the second single-film filter units reflect a second color beam.

5. The manufacturing method according to claim 1, wherein the step of forming the third filter layer comprises:
   forming a plurality of second multi-film filter units on where the second part and the third part of the second region overlap each other, wherein when the white beam is projected on the second multi-film filter units, the second multi-film filter units reflect a fourth color beam.

6. The manufacturing method according to claim 1, wherein the step of forming the third filter layer comprises:
   forming a plurality of third multi-film filter units on where the first part and the third part of the second region overlap each other, wherein when the white beam is projected on the third multi-film filter units, the third multi-film filter units reflect a fifth color beam.

7. The manufacturing method according to claim 1, wherein when the white beam is projected on the substrate, the first region reflects a yellow beam and a cyan beam.

8. The manufacturing method according to claim 1, wherein when the white beam is projected on the substrate, the second region reflects a red beam, a blue beam, and a green beam.

9. The manufacturing method according to claim 1, wherein materials of the first filter layer, the second filter layer, and the third filter layer are color resists.

* * * * *